United States Patent Office 3,435,023
Patented Mar. 25, 1969

3,435,023
WATER-SOLUBLE MONO AND DISAZO DYE-STUFFS CONTAINING N-(THIOSULFATO-ALKANOYLAMINO) GROUPS
Fritz Meininger and Ernst Hille, Frankfurt-am-Main, Germany, assignors to Farbwerke Hoechst Aktiengesellschaft vormals Meister Lucius & Bruning, Frankfurt-am-Main, Germany, a corporation of Germany
No Drawing. Filed Oct. 26, 1965, Ser. No. 505,233
Claims priority, application Germany, Nov. 6, 1964, F 44,381
Int. Cl. C09b 29/00, 39/00
U.S. Cl. 260—163
7 Claims

ABSTRACT OF THE DISCLOSURE

Azo dyestuffs containing at least one group of the formula

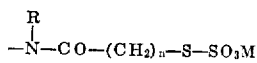

wherein R is a hydrogen atom or an alkyl group of 1 to 4 carbon atoms, M is a hydrogen or an alkali metal atom and $n$ is an integer 1 or 2, which dyestuffs are suitable for dyeing natural or regenerated cellulose fibers or nitrogen-containing fibers of both natural and synthetic origin.

---

The present invention provides water-soluble mono and disazo dyestuffs and a process for preparing them; it provides in particular water-soluble mono and disazo dyestuffs of the formula

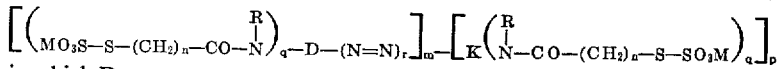

in which D represents an aromatic radical which may contain an azo group, K represents the radical of a coupling component, R stands for a hydrogen atom or a substituted or unsubstituted alkyl group having 1 to 4 carbon atoms, M represents a hydrogen or alkali metal atom, $n$ is 1 or 2, $q$ stands for 0, 1 or 2, at least one $q$ standing for 1 or 2, $m$, $p$ and $r$ stand for 1 or 2.

It has been found that the valuable water-soluble azo dyestuffs can be obtained by (a) Coupling aromatic diazo, tetrazo or azodiazo compounds with coupling components at least one of which contains one or several groups of the formula

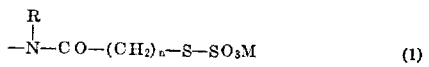

(1)

wherein R represents a hydrogen atom or a substituted or unsubstituted alkyl group having 1 to 4 carbon atoms, M represents a hydrogen or alkali metal atom and $n$ stands for 1 or 2, or (b) Reacting at pH-values ranging from 4 to 8 azo dyestuffs which contain at least one group of the formula

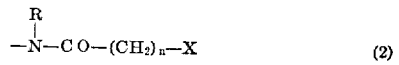

(2)

wherein X represents a halogen atom and R and $n$ have the meanings mentioned above, with salts of thiosulfuric acid, whereupon the group of Formula 2 is converted into the group of Formula 1.

The azo dyestuffs used as starting substances for the process of the present invention, or the aromatic diazo, tetrazo, azodiazo and coupling components used as starting substances, may contain in addition to one or several groupings (2) or (1) mentioned above, substituents imparting solubility in water, especially sulfonic acid and carboxylic acid groups. The number of groups imparting solubility in water, which may be present and which may be variously distributed in the dyestuff molecule, depends in the first place on the size of the molecule and on the intended application of the dyestuff.

For the preparation of dyestuffs according to embodiment (a) diazotised aromatic amines containing at least one substituent of Formula 1 are coupled with any coupling component, or coupling components containing that substituent at least once are combined with any diazotized aromatic amine, which also may contain a substituent of that kind. The coupling reaction is carried out under the usual conditions for azo dyestuffs in an acid, neutral or weakly alkaline medium. Appropriate diazo components are for example primary amines of the benzene, diphenyl or naphthalene series. Suitable coupling components are for example hydroxybenzenes, aminobenzenes, hydroxynaphthalenes, aminonaphthalenes, aliphatic or heterocyclic enols and enamines, such as malonic acid esters, pyrazolone derivatives, barbituric acid and hydroxyquinolines.

The diazo and coupling components used for the process of embodiment (a) which contain one or several groups of the above-mentioned Formula 1 can be prepared, for instance, by reaction of diazo or coupling components which contain at least one group of the aforementioned Formula 2, with salts of thiosulfuric acid in an aqueous or aqueous-organic solution or suspension at pH-values from 4 to 8.

As examples of compounds which can be converted into coupling and diazo components to be used according to the present process by reaction with salts of thiosulfuric acid, there may be mentioned:

(a) As diazo components the reaction products of salts of thiosulfuric acid with 4-(N-β-chloropropionylamino)-1-aminobenzene,
4-(N-chloroacetylamino)-1-aminobenzene,
3-(N-β-chloropropionylamino)-1-aminobenzene,
3-(N-chloroacetylamino)-1-aminobenzene,
3-(N-β-chloropropionylamino)-4-methoxy-1-aminobenzene,
3-(N-chloroacetylamino)-4-methoxy-1-aminobenzene,
4-(N-β-chloropropionylamino)-2:5-dimethoxy-1-aminobenzene,
4-(N-chloroacetylamino)-2:5-dimethoxy-1-aminobenzene,
4-(N-β-chloropropionylamino)-1-aminobenzene-2-sulfonic acid,
3-(N-β-chloropropionylamino)-1-aminobenzene-4-sulfonic acid,
4-(N-chloroacetylamino)-1-amino-benzene-2-sulfonic acid,
3-(N-chloroacetylamino)-1-amino-benzene-4-sulfonic acid,
4-(N-methyl-N-β-bromopropionylamino)-1-aminobenzene and compounds of the general formula

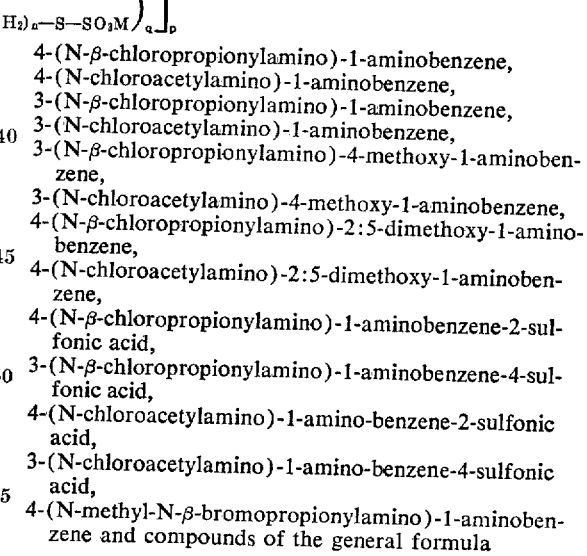

wherein R and $n$ have the meanings indicated above, B represents a direct linkage or a bridge member, for example a group of the formula —CH₂—, —O—, —S—, —CO—, —NH—, —SO₂—, —CO—NH—,

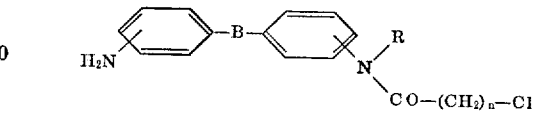

—SO₂—NH— or —N=N—, and the aromatic nuclei may carry additional substituents usually present in azo dyestuffs, for example halogen atoms or alkyl, alkoxy, nitro, cyano, carboxylic acid, carboxylic acid ester, carboxylic acid amide, sulfonic acid, sulfonic acid ester and sulfonic acid amide groups.

(b) As coupling components for example the reaction products of salts of thiosulfuric acid with 2-(N-β-chloropropionylamino)-5-hydroxynaphthalene-7-sulfonic acid,
2-(N-chloroacetylamino)-5-hydroxynaphthalene-7-sulfonic acid,
2-(N-β-chloropropionylamino)-8-hydroxynaphthalene-6-sulfonic acid,
2-(N-chloroacetylamino)-8-hydroxynaphthalene-6-sulfonic acid,
1-(N-β-chloropropionylamino)-8-hydroxynaphthalene-3:6-disulfonic acid,
1-(N-chloroacetylamino)-8-hydroxynaphthalene-3:6-disulfonic acid,
keto-carboxylic acid derivatives, in particular acetoacetic acetoacetic acid anilides and pyrazolones, as well as 2:3-hydroxynaphthoic acid arylides.

The azo dyestuffs obtained according to the process of the present invention are prepared according to embodiment (b) by reacting the starting dyestuffs, which contain at least one group of Formula 2, in an aqueous or aqueous-organic solution or suspension with salts of thiosulfuric acid at pH-values ranging from 4 to 8, preferably from 6 to 7. It is of advantage to effect the reaction at temperatures within a range of 40° to 150° C., preferably of 80° to 100° C. As organic solvents which in admixture with water may be used as reaction medium, there are mentioned methanol, ethanol and dioxane.

Usually dyestuffs containing halogenoacetylamino or halogenopropionylamino groups and thiosulfate are reacted in an equivalent proportion. In some cases, however, an excess of thiosulfate is of advantage.

As salts of thiosulfuric acid there are used the alkali metal and alkaline earth metal salts, particularly sodium thiosulfate both in its anhydrous and water-of-crystallisation-containing form.

The azo dyestuffs obtained according to the process of the present invention are suitable for dyeing and printing material of various kinds, for example of natural or regenerated cellulose fibers, or nitrogen-containing fibers both of animal and synthetic origin, such as wool, silk, polyamide or polyurethane fibers or of leather.

The dyestuffs are distinguished by a good solubility and high resistance to alkalis.

In the presence of alkali-yielding agents there are obtained on cellulose materials strong dyeings and prints of good to very good fastness to wet processing, especially to washing. On wool there are obtained, when dyeing in a weakly acetic acid or neutral bath, clear strong shades of good to very good fastness to wet processing, especially to washing. Moreover, the cotton and wool dyeings possess a good to very good fastness to light, rubbing and dry cleaning.

The following examples illustrate the invention but they are not intended to limit it thereto, the parts being by weight unless otherwise stated and the relationship of parts by weight to parts by volume being that of the kilogram to the litre.

Example 1

99.3 parts of 4-(N-β-chloropropionylamino)-1-aminobenzene and 136.5 parts of sodium thiosulfate containing water of crystallisation are dissolved in 400 parts by volume of aqueous ethanol of 50%, heated while stirring to 78°–80° C. and maintained at this temperature for 2 hours. The ethanol is subsequently distilled off in vacuo, 1 part charcoal is added to the aqueous solution, the whole is stirred for a short period of time and filtered. The filtrate is adjusted to pH 2–3 by means of concentrated hydrochloric acid, whereupon the reaction product precipitates in the form of an inner salt. The compound of the formula

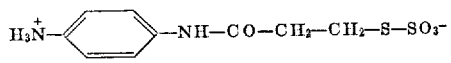

still containing a small quantity of sulfur, is isolated by filtration, and may be purified by dissolving it once or twice in a sodium bicarbonate solution and subsequently acidifying with concentrated hydrochloric acid. The precipitated product is dried in vacuo at 60° C. There is obtained a pale pink crystalline powder melting at 255° C. with decomposition.

*Analysis.*—Molecular weight 276.33. Calculated: C, 39.12%; H, 4.38%; N, 10.16%; S, 23.21%. Found: C, 39.3%; H, 4.7%; N, 10.6%; S, 23.2%.

27.6 parts of the compound obtained are dissolved in 200 parts by volume of water while adding 5.3 parts of anhydrous sodium carbonate and mixed with 25 parts by volume of 4 N sodium nitrite solution. The mixture is then added drop by drop at 0°–5° C. to a mixture of 25 parts by volume of concentrated hydrochloric acid and 100 parts of powdered ice. On completion of the diazotisation the pH-value is adjusted to 6 by means of anhydrous sodium carbonate. 31.3 parts of finely powdered 1-naphthol-4:8-disulfonic acid are added by portions while stirring, the pH-value of 6–6.5 being maintained by further addition of anhydrous sodium carbonate. On completion of the coupling the whole is clarified, the dyestuff formed is salted out with 20% of sodium chloride (referred to the volume of the solution), filtered with suction, washed and dried at 60° C. in vacuo. A red powder is obtained which is easily soluble in water. With the new dyestuff of the formula

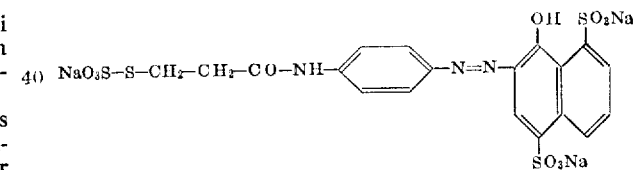

there are obtained on cotton in the presence of sodium carbonate strong brilliant red prints of very good fastness to washing and good fastness to light.

When using instead of 27.6 parts of the compound of the formula

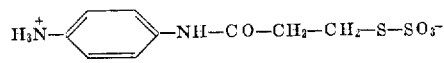

29.0 parts of the compound of the formula

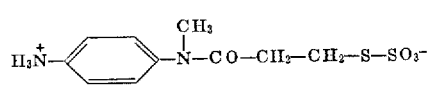

as diazo component and proceeding as described above, a dyestuff is obtained which produces on cotton, in the presence of agents having an alkaline effect, deep red dyeings and prints of very good fastness to washing and good fastness to light.

Example 2

99.3 parts of 3-(N-β-chloropropionylamino)-1-aminobenzene and 136.5 parts of sodium thiosulfate containing water of crystallisation are reacted, according to Example 1 in 400 parts by volume of aqueous ethanol of 50% and worked up. As reaction product there is obtained the inner salt of the formula

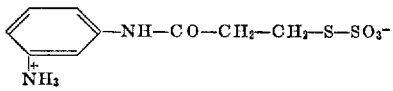

which after recrystallisation from water melts at 208° C. with decomposition.

*Analysis.*—Molecular weight 276.33. Calculated: C, 39.12%; H, 4.38%; N, 10.16%; S, 23.21%. Found: C, 39.3%; H, 4.6%; N, 10.7%; S, 23.2%.

27.6 parts of the compound obtained are suspended in 400 parts by volume of water and 15 parts by volume of concentrated hydrochloric acid and diazotised at 0°–5° C. with 25 parts by volume of 4 N-sodium nitrite solution. After the diazotisation has ceased the whole is neutralised with sodium carbonate. The diazonium solution is dropped into a neutralised solution of 37.1 parts of 2-acetylamino - 8 - naphthol - 3:6 - disulfonic acid in 200 parts by volume of water. On completion of the coupling the dyestuff is isolated by salting out with 20% of sodium chloride and 10% of potassium chloride (referred to the volume of the solution). The dyestuff of the formula

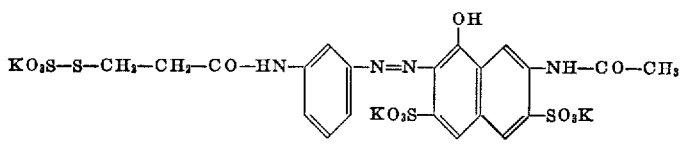

dyes cotton in the presence of alkali-yielding agents brilliant red shades of very good fastness to washing.

Example 3

141.4 parts of 4-(N-β-chloropropionylamino)-2-methyl-5-methoxy-1-aminobenzene and 136.5 parts of sodium thiosulfate containing water of crystallisation are dissolved in 300 parts by volume of water and 300 parts by volume of ethanol and reacted and worked up under the conditions described in Example 1. There is obtained the inner salt of the compound of the formula

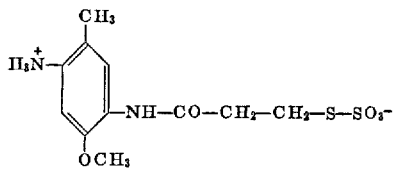

which after recrystallisation from hot water precipitates in form of slightly pink tinted crystals which melt at 235°– 238° C., with decomposition.

*Analysis.*—Molecular weight 320.38. Calculated: C, 41.33%; H, 4.73%; N, 8.77%; S, 20.08%. Found: C, 41.3%; H, 5.4%; N, 9.1%; S, 20.0%.

32 parts of the compound obtained are introduced into a mixture of 400 parts by volume of water and 15 parts by volume of concentrated hydrochloric acid and diazotised at 0°–5° C. with 25 parts by volume of 4 N-sodium nitrite solution and coupled in the known manner with 31 parts of 1-(2'-methyl-5'-chloro - 4' - sulfophenyl)-3-methylpyrazolone-(5). After coupling the dyestuff is precipitated with 20% of sodium chloride (referred to the volume of the solution). After filtering with suction and drying, an orange powder is obtained which dissolves easily in water.

The dyestuff of the formula

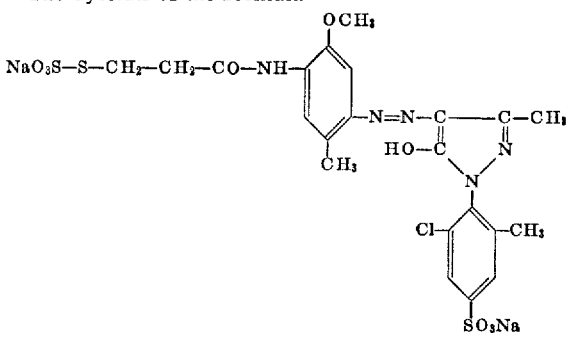

gives on cellulose textiles in the presence of sodium carbonate strong orange prints of very good fastness to washing and light.

Example 4

58.8 parts of the dyestuff of the formula

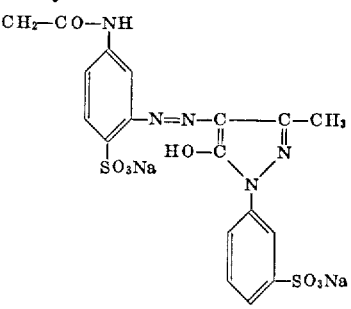

and 30 parts of sodium thiosulfate containing water of crystallisation are dissolved in 500 parts by volume of water and heated under reflux for 3 hours. On completion of the reaction the whole is filtered hot and the dyestuff is precipitated with 20% of sodium chloride (referred to the volume of the solution). After filtering and drying, a yellow powder is obtained which dissolves in water producing a yellow solution.

The dyestuff of the formula

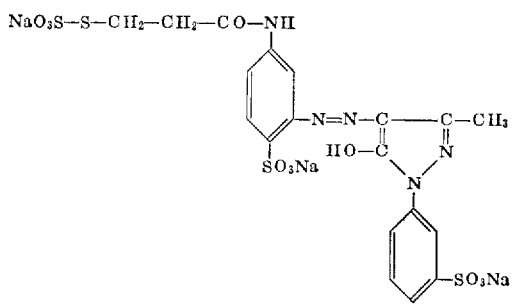

gives in the presence of sodium carbonate strong greenish yellow prints on cotton fast to washing and light.

Example 5

66.3 parts of the dyestuff of the formula

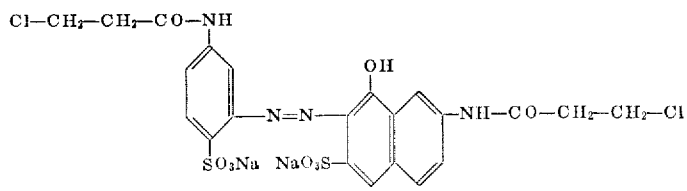

and 60 parts of sodium thiosulfate containing water of crystallisation are heated under reflux for 3 hours in 500 parts by volume of water. After filtering, the dyestuff solution is evaporated to dryness in vacuo at 60° C. After grinding the dry residue, a red powder is obtained which dissolves easily in water. The dyestuff of the formula

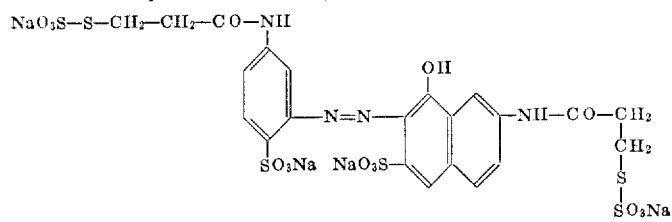

produces in the presence of alkali-yielding agents on cotton brilliant orange prints fast to washing and light.

By reacting the dyestuff of the formula

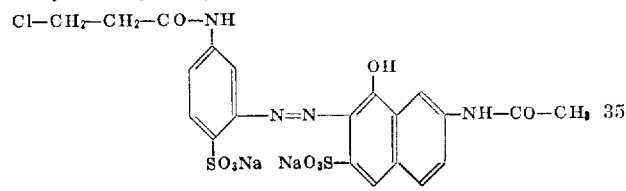

with sodium thiosulfate as described above, a dyestuff of similar properties is obtained.

Example 6

47 parts of the dyestuff of the formula

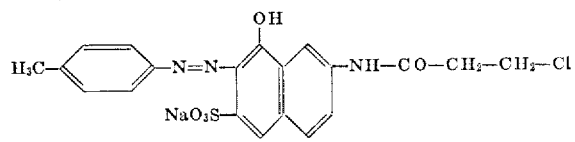

and 30 parts of sodium thiosulfate containing water of crystallisation are reacted according to Example 4.

After precipitating the dyestuff with 20% of potassium chloride (referred to the volume of the solution) the whole is filtered with suction and dried. The dyestuff of the formula

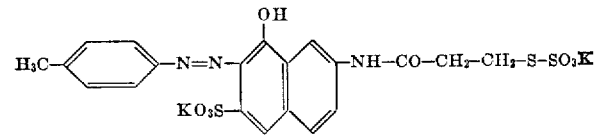

is a red, water-soluble powder which dyes cotton in the presence of sodium carbonate brilliant red shades fast to washing and light. On wool there are obtained according to the known dyeing and printing method red shades of very good fastness to washing and light.

Example 7

77.9 parts of the dyestuff of the formula

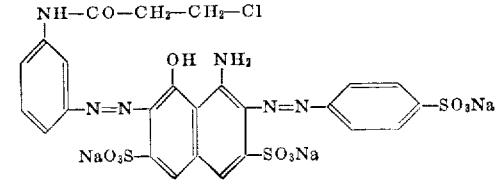

and 30 parts of sodium thiosulfate containing water of crystallisation are dissolved in 600 parts by volume of water and heated to the boil under reflux for 3 hours.

On completion of the reaction the whole is filtered hot and the dyestuff is precipitated by addition of 20% of potassium chloride (referred to the volume of the solution). After working up a blue powder is obtained which in the presence of sodium carbonate produces on cotton blue prints fast to washing and light.

Example 8

176.9 parts of the sodium salt of 1-(N-β-chloropropionylamino)-8-naphthol-3:6-disulfonic acid and 150 parts of sodium thiosulfate containing water of crystallisation are dissolved in 1000 parts by volume of water and heated under reflux for 3 hours. As the reaction product of the formula

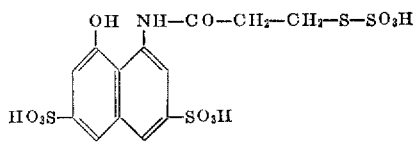

can be precipitated neither as potassium salt nor as sodium salt, the solution is filtered hot after the reaction and made up to 1500 parts by volume of water.

8.3 parts of aniline are suspended in 100 parts by volume of water and 15 parts by volume of concentrated hydrochloric acid and diazotised at 0°–5° C. with 25 parts by volume of 4 N-sodium nitrite solution. After the neutralisation of the diazonium salt solution with sodium carbonate 500 parts by volume of the solution of the reaction product of 1-(N-β-chloropropionylamino)-8-naphthol-3:6-disulfonic acid and sodium thiosulfate are added. On completion of the coupling the dyestuff formed is isolated by salting out with sodium chloride.

The dyestuff of the formula thus obtained

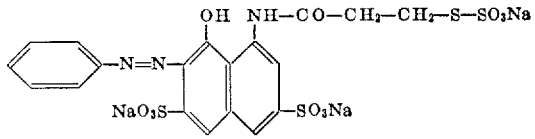

dyes cotton in the presence of sodium carbonate bluish red shades fast to washing and light.

Example 9

92.31 parts of 4-(N-chloracetylamino)-1-aminobenzene and 136.5 parts of sodium thiosulfate containing water of crystallisation are dissolved in 200 parts by volume of water and 200 parts by volume of ethanol and heated under reflux for 2 hours while stirring. On completion of the reaction the ethanol is distilled off in vacuo, the aqueous solution stirred with 1 part of charcoal and filtered. By acidifying with concentrated hydrochloric acid to attain pH 2 there is obtained from the filtrate the reaction product in form of a hardly soluble inner salt of the formula

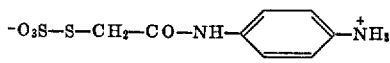

After recrystallisation from hot water, slightly yellow tinted crystals are obtained which decompose at temperatures above 290° C. with carbonisation.

*Analysis.*—Molecular weight 262.31. Calculated: C, 36.63%; H, 3.84%; N, 10.68%; S, 24.45%. Found: C, 37.0%; H, 4.1%; N, 10.7%; S, 24.3%.

26.2 parts of the compound described above are diazotised at 0°–5° C. in 400 parts by volume of water and 15 parts by volume of concentrated hydrochloric acid with 25 parts by volume of 4 N-sodium nitrite solution. On completion of the diazotisation the solution is adjusted to pH 5 by means of sodium acetate, subsequently 29 parts of 2-acetylamino-8-naphthol-6-sulfonic acid are slowly introduced. After the coupling the solution is clarified and the dyestuff is precipitated by adding 20% of sodium chloride (referred to the volume of the solution) and dried.

The dyestuff of the formula

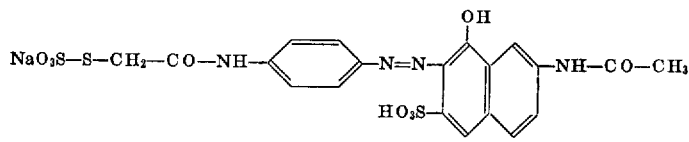

dyes wool according to the known dyeing and printing methods strong red shades fast to washing and light. On cotton there is obtained in the presence of sodium carbonate a red print pattern fast to washing and light.

Example 10

45.6 parts of the dyestuff of the formula

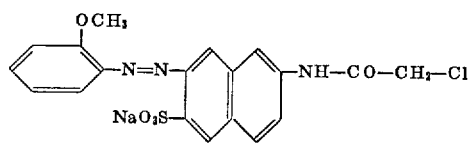

and 30 parts of sodium thiosulfate containing water of crystallisation are dissolved in 500 parts by volume of water and heated under reflux for 3 hours. After the reaction the whole is filtered hot and the dyestuff is precipitated with 20% of sodium chloride (referred to the volume of the solution). After filtering with suction and drying the dyestuff of the formula

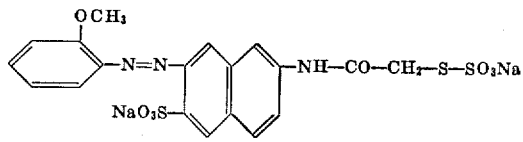

is obtained in form of a red brown powder which dissolves in water producing a red solution.

This dyestuff produces on wool according to the known dyeing methods red shades of very good fastness to washing.

Example 11

138 parts of the compound of the formula

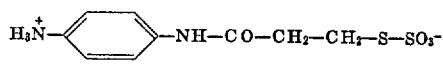

are suspended in 600 parts by volume of water and dissolved by addition of 27 g. of sodium carbonate. While thoroughly stirring the solution, 44 parts of diketene are added dropwise at 15°–20° C. the pH-value of the solution being maintained at 6.5–7 by adding sodium carbonate. The whole is then stirred for 30 minutes. As the reaction product of the formula

is salted out only partially by addition of sodium chloride or potassium chloride, the solution is made up to 1000 parts by volume by means of water and can thus be used for the further reactions.

13.7 parts of 2-aminobenzoic acid are suspended in a mixture of 200 parts by volume of water and 15 parts by volume of concentrated hydrochloric acid and diazotised at 0°–5° C. with 25 parts by volume of 4 N-sodium nitrite solution. After the neutralisation of the diazonium solution with sodium carbonate, 200 parts by volume of the solution of the reaction product given above of 1 - (β - thiosulfatopropionylamino)-4-aminobenzene with diketene are added. On completion of the coupling the dyestuff formed is isolated by salting out with 10% of sodium chloride (referred to the volume of the solution). The new dyestuff of the formula

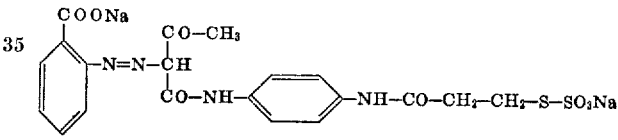

dissolves in water producing a yellow solution and dyes wool in a weakly acetic bath clear yellow shades of excellent fastness to washing.

Example 12

140 parts of the compound of the formula

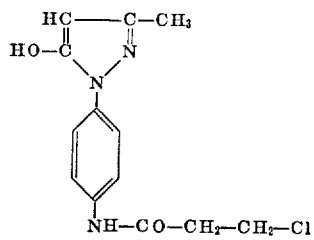

and 136.5 parts of sodium thiosulfate containing water of crystallisation are stirred for 3 hours under reflux in a mixture of 800 parts by volume of ethanol and 800 parts by volume of water. The ethanol is subsequently distilled off in vacuo. The remaining aqueous solution is separated by filtration from a small quantity of a precipitated, water-insoluble precipitate after leaving it overnight. As the reaction product of the formula

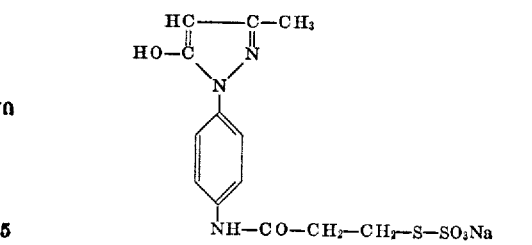

cannot be isolated by salting out with sodium chloride or potassium chloride, the aqueous solution is used directly for further reactions. The solution's content of the pyrazolone derivative is determined by measuring the coupling value.

12.75 parts of 2-chloraniline are diazotised in a mixture of 200 parts by volume of water and 25 parts by volume of concentrated hydrochloric acid at 0°–5° C. with 25 parts by volume of 4 N-sodium nitrite solution. After the neutralisation of the diazonium solution with sodium carbonate 37.9 parts of the sodium salt of 1-(4'-β-thiosulfato - propionylaminophenyl)-3-methylpyrazolone-(5) are added in the form of the aqueous solution described above. On completion of the coupling, the dyestuff, which has precipitated in parts, is completely precipitated by addition of 10% of sodium chloride (referred to the volume of the solution) and isolated. The new dyestuff of the formula

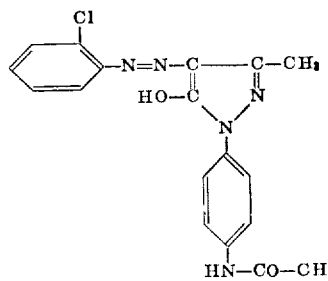

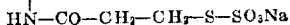

dyes wool strong yellow shades of excellent fastness to washing and good fastness to light.

The following table lists further additional dyestuffs, and their shades on cotton, which are obtained as described in the afore-mentioned examples either by reacting azo dyestuffs which contain at least one group of Formula 2 given above, with salts of thiosulfuric acid, or by coupling aromatic diazo, tetrazo or azodiazo compounds with coupling components at least one of which contains at least one group of Formula 1 given above.

| | Dyestuff | Tint on cotton |
|---|---|---|
| 1 | HO₃S—S—CH₂—CH₂—CO—NH—⟨C₆H₄⟩—N=N—[naphthalene with OH, SO₂—NH₂, HO₃S] | Ruby red. |
| 2 | HO₃S—S—CH₂—CH₂—CO—NH—⟨C₆H₄⟩—N=N—C(=C—CH₃)—... pyrazolone with phenyl-SO₃H | Reddish yellow. |
| 3 | HO₃S—S—CH₂—CH₂—CO—NH—⟨C₆H₄⟩—N=N—[naphthalene with OH, SO₃H, SO₃H] | Bluish red. |
| 4 | HO₃S—S—CH₂—CH₂—CO—NH—⟨C₆H₄⟩—N=N—[naphthalene with OH, NH—CO—C₆H₅, HO₃S] | Red. |
| 5 | HO₃S—S—CH₂—CH₂—CO—NH—⟨C₆H₄⟩—N=N—C(=C—CH₃)—... pyrazolone with phenyl | Yellow. |
| 6 | [3-(NH—CO—CH₂—CH₂—S—SO₃H)-phenyl]—N=N—[2-methyl-4-(N,N-di(2-hydroxyethyl)amino)phenyl] | Reddish yellow. |

| Dyestuff | Tint on cotton |
|---|---|
| 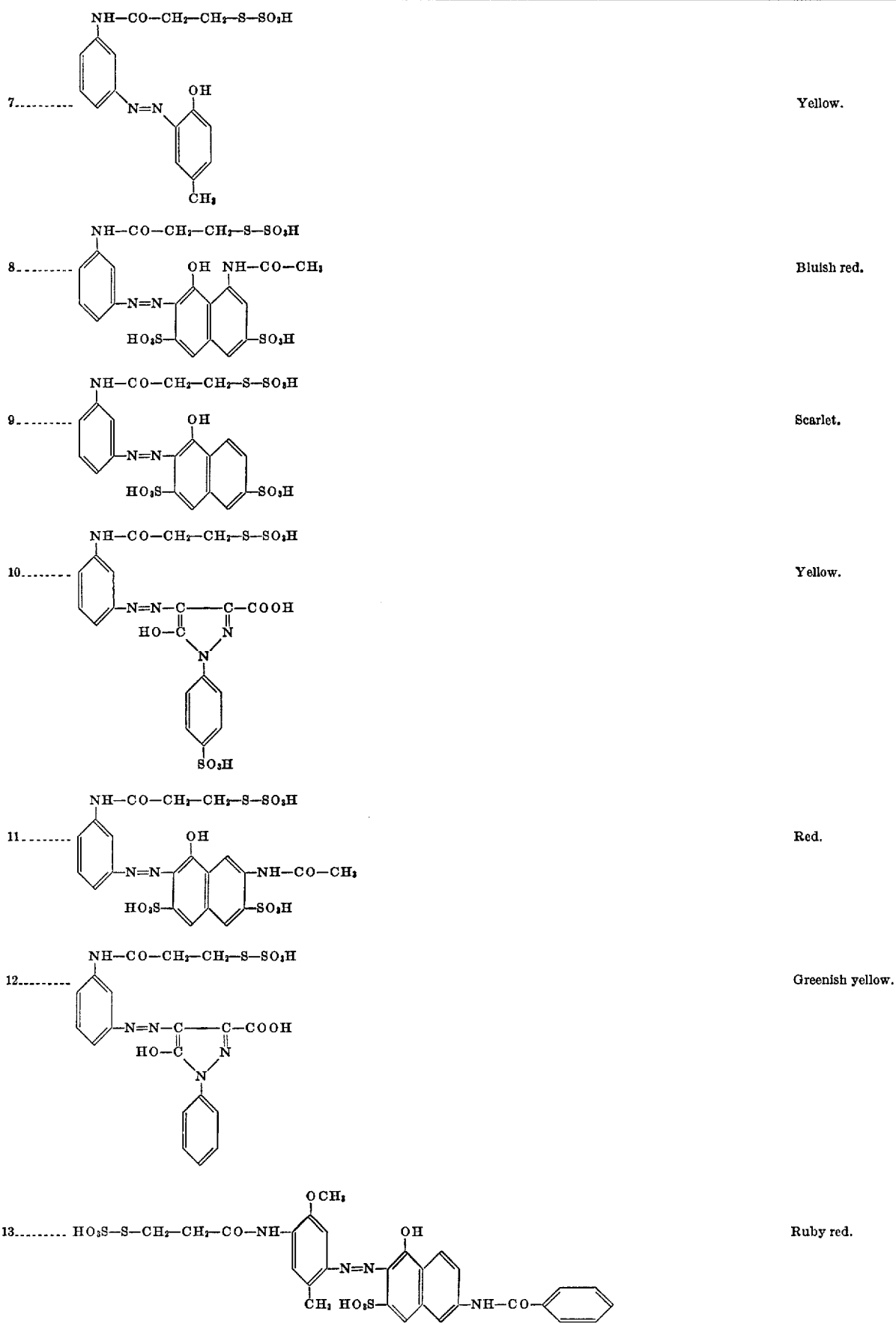 | Yellow. |
| | Bluish red. |
| | Scarlet. |
| | Yellow. |
| | Red. |
| | Greenish yellow. |
| | Ruby red. |

| Dyestuff | Tint on cotton |
|---|---|
| 14. Structure: HO₃S—S—CH₂—CH₂—CO—NH—(phenyl with OCH₃ and CH₃)—N=N—(naphthyl with OH and HO₃S) | Do. |
| 15. Structure: HO₃S—S—CH₂—CH₂—CO—NH—(phenyl with OCH₃ and CH₃)—N=N—C(pyrazolone with CH₃, HO—C, N-aryl bearing Cl, CH₃, SO₃H) | Orange. |
| 16. Structure: HO₃S—S—CH₂—CH₂—CO—NH—(phenyl with OCH₃ and CH₃)—N=N—C(pyrazolone with CH₃, N-aryl bearing 2,5-diCl) | Reddish yellow. |
| 17. Structure: (phenyl bearing NH—CO—CH₂—CH₂—S—SO₃H and SO₃H)—N=N—(naphthyl with OH and SO₃H) | Scarlet. |
| 18. Structure: (phenyl bearing NH—CO—CH₂—CH₂—S—SO₃H and SO₃H)—N=N—(naphthyl with OH, HO₃S, and NH—CO—CH₃) | Orange. |
| 19. Structure: (phenyl with OCH₃)—N=N—(naphthyl with OH, HO₃S, SO₃H, and NH—CO—CH₂—CH₂—S—SO₃H) | Bluish red. |
| 20. Structure: (phenyl with SO₃H)—N=N—(naphthyl with OH, HO₃S, and NH—CO—CH₂—CH₂—S—SO₃H) | Scarlet. |
| 21. Structure: (phenyl with OCH₃ and HO₃S)—N=N—(naphthyl with OH and NH—CO—CH₂—CH₂—S—SO₃H) | Red. |

| Dyestuff | Tint on cotton |
|---|---|
| 22. 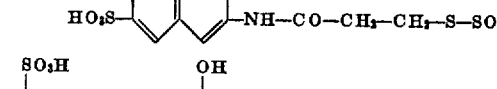 | Orange. |
| 23. 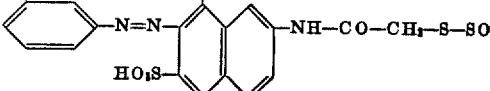 | Do. |
| 24. 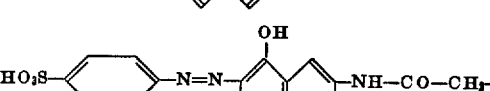 | Red. |
| 25. 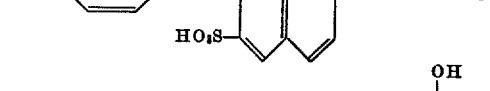 | Bluish red. |
| 26. 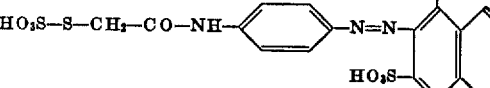 | Red. |
| 27. 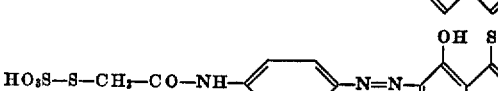 | Bluish red. |
| 28. 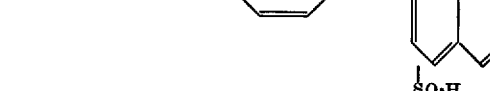 | Yellow. |
| 29. 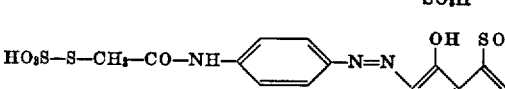 | Do. |
| 30.  | Do. |
| 31. 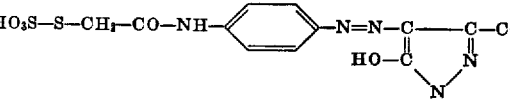 | Do. |

| Dyestuff | Tint on cotton |
|---|---|
| 32. 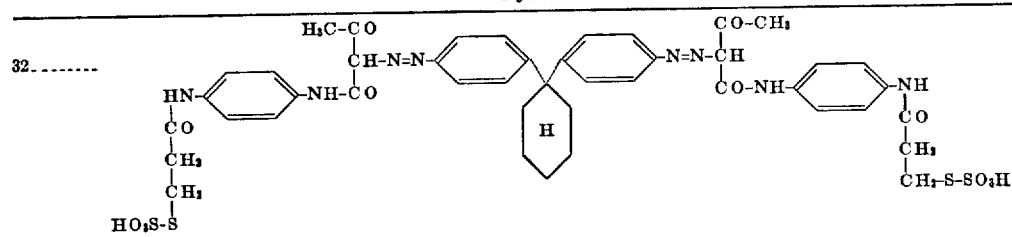 | Do. |
| 33. 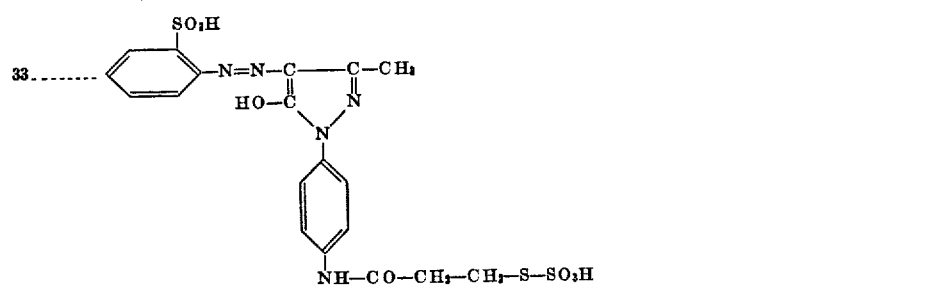 | Do. |
| 34. 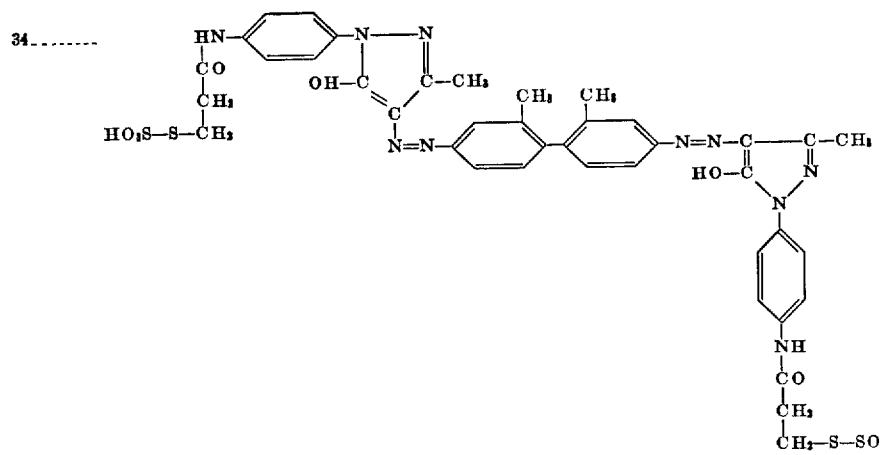 | Do. |
| 35.  | Bluish red. |

We claim:
1. Monoazo dyestuffs of the formula

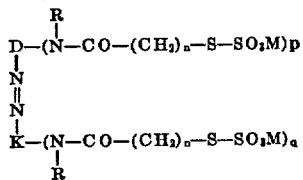

wherein D represents a radical of the benzene series, K represents a radical of the benzene, naphthalene, pyrazolone or acetoacetylphenylamino series, R represents hydrogen or alkyl having 1 to 4 carbon atoms, M represents hydrogen, sodium or potassium, $n$ represents 1 or 2 and $p$ and $q$ stand each time for 0, 1 or 2, the sum of $p$ and $q$ being at least 1.

2. The monoazo dyestuff of the formula

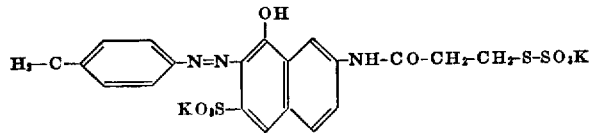

3. The monoazo dyestuff of the formula

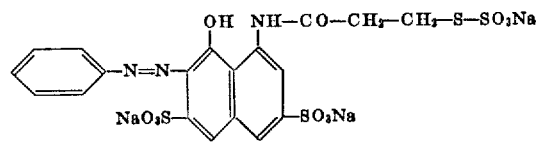

4. The monoazo dyestuff of the formula

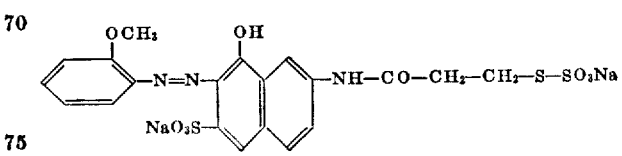

5. The monoazo dyestuff of the formula
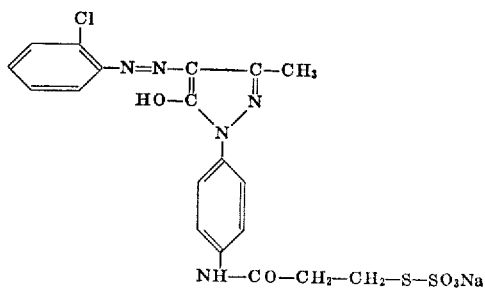
6. The monoazo dyestuff of the formula
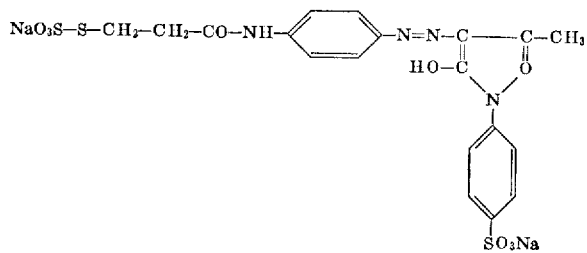
7. The monoazo dyestuff of the formula
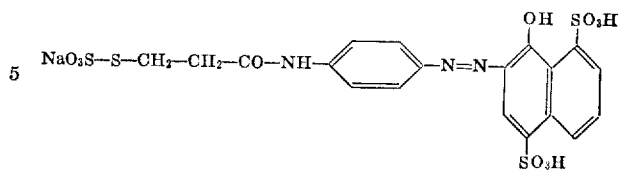
References Cited
UNITED STATES PATENTS
3,236,860  2/1966  Schultheis et al. __ 260—163 XR
FOREIGN PATENTS
221,511    6/1962  Austria.
677,934    1/1964  Canada.
1,302,321  7/1962  France.
FLOYD D. HIGEL, *Primary Examiner.*
U.S. Cl. X.R.
260—199, 201, 154, 155, 456, 196, 193, 310, 207.1, 207, 181, 178, 160; 8—41, 50, 51, 63, 71, 13